(12) United States Patent
Womack et al.

(10) Patent No.: US 7,113,687 B2
(45) Date of Patent: Sep. 26, 2006

(54) CARRIER FOR MULTIPLE SPLICE TRAYS

(75) Inventors: Wade J. Womack, Allen, TX (US); Richard Lee Case, Omaha, NE (US)

(73) Assignee: Commscope Solutions Properties LLC, Sparks, NV (US)

( * ) Notice: Subject to any disclaimer, the term of this patent is extended or adjusted under 35 U.S.C. 154(b) by 0 days.

(21) Appl. No.: 11/367,631

(22) Filed: Mar. 3, 2006

(65) Prior Publication Data

US 2006/0147173 A1  Jul. 6, 2006

Related U.S. Application Data

(62) Division of application No. 10/840,681, filed on May 6, 2004.

(51) Int. Cl.
*G02B 6/00* (2006.01)

(52) U.S. Cl. .................. 385/135; 385/134; 385/147

(58) Field of Classification Search ........ 385/134–135, 385/147
See application file for complete search history.

(56) References Cited

U.S. PATENT DOCUMENTS

| | | | |
|---|---|---|---|
| 4,373,776 | A | 2/1983 | Purdy et al. |
| 4,812,004 | A * | 3/1989 | Biederstedt et al. ........ 385/135 |
| 6,253,016 | B1 | 6/2001 | Daoud |
| 6,275,641 | B1 | 8/2001 | Daoud |
| 6,418,266 | B1 | 7/2002 | Vitantonio |
| 2002/0126978 | A1 | 9/2002 | Holman et al. |

FOREIGN PATENT DOCUMENTS

JP   61 204605   2/1987

OTHER PUBLICATIONS

Partial European Search Report for European patent application No. EP 05 00 8560 completed on Jul. 14, 2005.
Partial European Search Report and Lack of Unity of Invention for European patent application No. 05 00 8560 mailed on Dec. 22, 2005.
Partial European Search Report for European patent application No. EP 05 00 8560 completed on Nov. 10, 2005.
Fibrlok™ II Optical Splicing System catalog, 3M, pp. 162-182.
Richco Fiber Optic Catalog, Edition F01 (2001).

* cited by examiner

*Primary Examiner*—Sung Pak
*Assistant Examiner*—James D. Stein
(74) *Attorney, Agent, or Firm*—Myers Bigel Sibley & Sajovec

(57) ABSTRACT

A splice site carrier includes an interconnecting member and a plurality of generally planar carrier members that are pivotally interconnected therewith. The carrier members are configured to receive a splice tray mounted on a front side thereof. Each of the carrier members is pivotable about a respective pivot axis between an access position, in which the front side of the carrier member faces in a first direction, such that the splice tray is presented for access to splice sites thereon, and a non-access position that is at least partially inverted from the access position, in which a rear side of the carrier member is presented and the splice tray is not accessible.

14 Claims, 9 Drawing Sheets

CARRIER FOR MULTIPLE SPLICE TRAYS

CLAIM FOR PRIORITY AND CROSS-REFERENCE TO OTHER APPLICATIONS

This application claims priority to and is a divisional of parent application Ser. No. 10/840,681, filed May 6, 2004, the disclosure of which is hereby incorporated herein by reference.

FIELD OF THE INVENTION

The present invention is directed to the splicing of optical fibers, and more particularly to the splicing of optical fibers with splicing trays.

BACKGROUND OF THE INVENTION

Optical fibers and cables have become very common data carriers. One issue that can arise with optical fibers is their interconnection with other optical fibers. For example, many industrial, office and apartment buildings include data centers, where cables transmitting data from outside the building are ultimately interconnected with devices (phones, computers, and the like) inside the building. Commonly, incoming optical fibers pass to the data center in cable form, where they are spliced together with "pigtail" cables. The pigtail cables travel to a termination point, where they are interconnected with a termination device (for example, a termination cartridge or module) that, in turn, interconnects them with "jumper" fibers that exit to other parts of the building for use with various devices.

Splicing of optical fibers is often accomplished via one of three different splicing techniques: mechanical splicing; fusion splicing; or mass fusion splicing. These techniques are well known and need not be described in detail herein. Splices are often stored in splice trays, which are generally planar devices that include multiple splicing sites designed to organize interconnected fibers and splices. Splice trays can assist in keeping a number of spliced fibers in an organized arrangement (typically a tray will have a capacity of 6 to 24 splices). Splice trays are then stored inside shelves on an equipment rack within the data center. An exemplary splice tray is the 2524-MF FIBRLOK multi-fiber splice organizer tray, available from 3M, Minneapolis, Minn.

As data centers are required to handle increased amounts of data, they often accumulate vast numbers of cables, pigtail fibers and jumper fibers to be spliced and terminated. In an effort to include increasing numbers of splice trays on a single shelf, in some instances splice trays have been stacked on top of one another to reduce the amount of space that they occupy; in certain of these instances, the splice trays have been adhered together with "double-stick" tape to attempt to maintain some degree of organization within an equipment rack shelf. Nevertheless, as the density of cables and fibers grows, it would be desirable to provide more splicing sites in a limited space, and to maintain and/or improve the level of organization that that splice trays can provide.

SUMMARY OF THE INVENTION

The present invention is directed to a multi-tray splice site carrier that can accommodate and organize multiple splice trays in a relatively small space and present them quickly and easily for work thereon. As a first aspect, a splice site carrier of the present invention includes an interconnecting member and a plurality of generally planar carrier members that are pivotally interconnected with the interconnecting member. The carrier members are configured to receive a splice tray mounted on a front side thereof. Each of the carrier members is pivotable about a respective pivot axis between an access position, in which the front side of the carrier member faces in a first direction, such that the splice tray is presented for access to splice sites thereon, and a non-access position that is at least partially inverted from the access position, in which a rear side of the carrier member is presented and the splice tray is not accessible. When all of the plurality of carrier members are in the access position, at least some of the carrier members are in stacked, generally parallel relationship, and when all of the carrier members are in the non-access position, at least some of the carrier members are in stacked, generally parallel relationship. The carrier members can be rotated individually from the access position to the non-access position to provide access to any of the carrier members. In this configuration, a user can quickly access any of the splice trays in index-card fashion while the splice trays remain in an organized arrangement.

In some embodiments, the interconnecting member is a base, with the carrier members being pivotally interconnected with the base. In certain of these embodiments, the respective pivot axes of the carrier members may be staggered vertically and horizontally relative to one another. The non-access position may cause the front side of the carrier member to be generally inverted from the access position, or may cause the front side of the carrier member to face in a direction generally normal to that of the access position.

In other embodiments, the splice site carrier can be formed of an elongate sheet of flexible material that is folded upon itself to form a plurality of leaves that serve as carrier members, with intermediate panels positioned between pairs of leaves serving as the interconnecting member. In this embodiment, the carrier members pivot relative to the intermediate panels via living hinges formed in the elongate sheet. In certain embodiments, when the carrier members are in their access positions, they are in stacked, generally parallel relationship with each other. A cover member that is also formed from the flexible sheet can be employed to secure the carrier members in their access positions.

DETAILED DESCRIPTION OF EMBODIMENTS OF THE INVENTION

The present invention will now be described more fully hereinafter with reference to the accompanying drawings, in which preferred embodiments of the invention are shown. This invention may, however, be embodied in many different forms and should not be construed as limited to the illustrated embodiments or other embodiments set forth herein; rather, these embodiments are provided so that this disclosure will be thorough and complete, and will fully convey the scope of the invention to those skilled in the art. In the figures, the dimensions of some components may be exaggerated for clarity.

Figure 1:
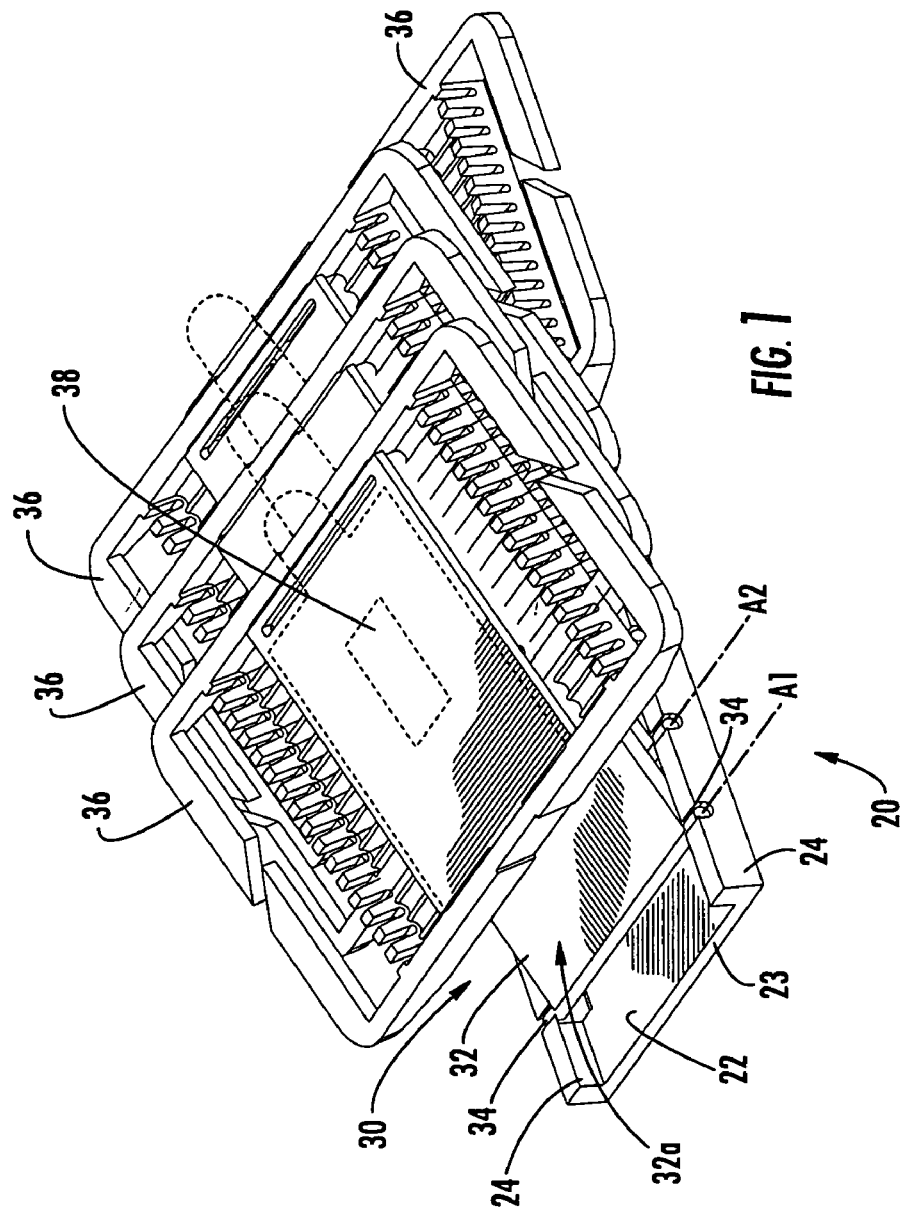
FIG. 1 is a perspective view of a splice site carrier according to embodiments of the present invention, wherein the carrier members are shown in their access positions.
Figure 2:
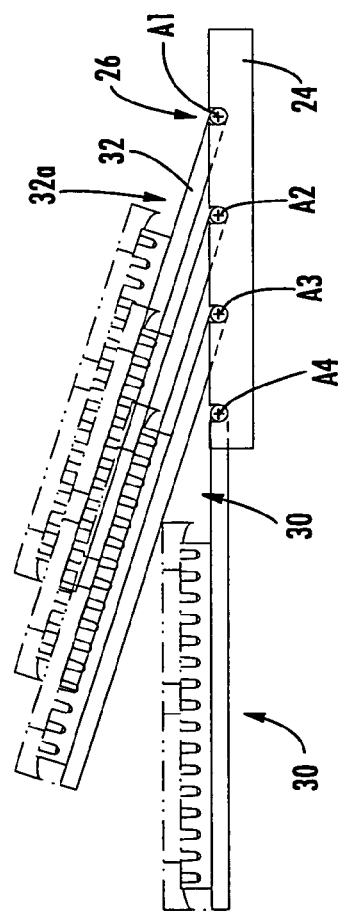
FIG. 2 is a side view of the splice site carrier of FIG. 1 with the carrier members in their access positions
Figure 2A:
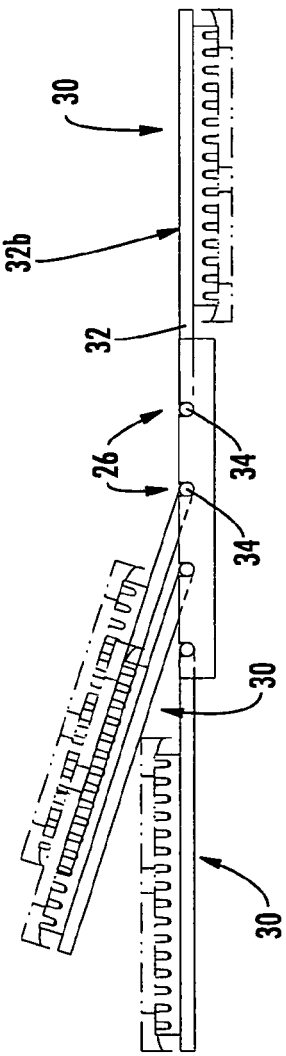
FIG. 2A is a side view of the splice site carrier of FIG. 1 as shown in FIG. 2, with the frontmost carrier member in its non-access position.
Figure 3:
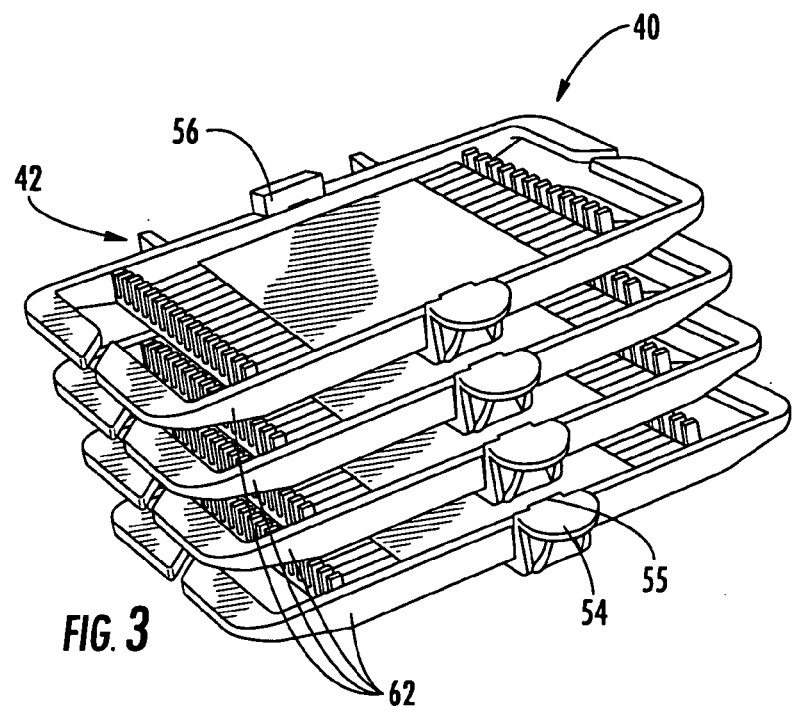
FIG. 3 is a top perspective view of a splice site carrier according to other embodiments of the present invention, wherein the carrier members are shown in their access positions.
Figure 4:
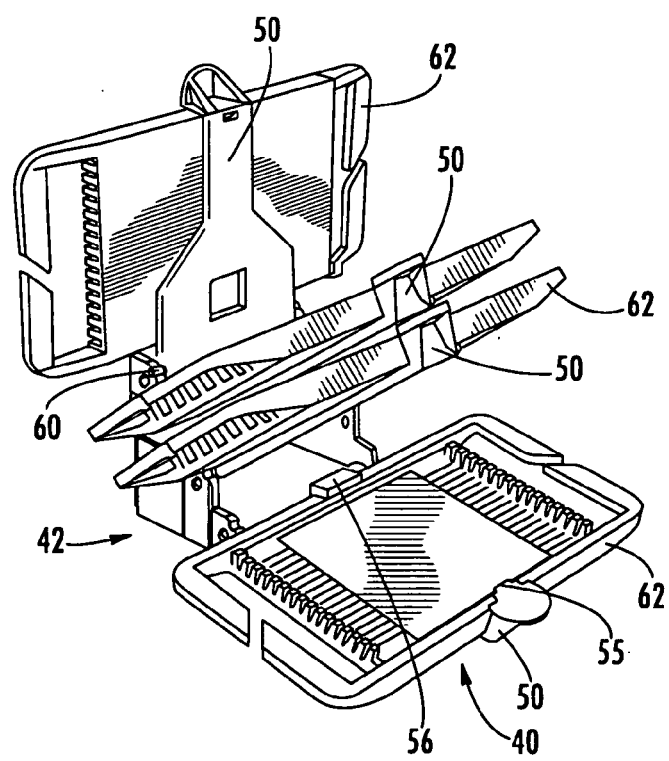
FIG. 4 is a top perspective view of the splice site carrier of FIG. 3 with one carrier member shown in its non-access position and two carrier members shown in an intermediate position.

Turning now to the figures, a splice site carrier of the present invention, designated broadly at 20, is illustrated in FIGS. 1, 2 and 2A. The carrier 20 includes a base 22 configured to rest on or be mounted upon an underlying surface, such as the upper surface of a shelf within a data center equipment rack. The base 22 has a floor 23 and short side rails 24 on opposite sides of the floor 23. Four slotted apertures 26 with open upper ends are located on each side rail 24. The apertures 26 are positioned such that each aperture 26 is in substantial alignment with an aperture 26 on the opposite side rail 24, with the result that each opposing pair of apertures 26 forms a respective pivot axis A1, A2, A3, A4. In the illustrated embodiment, all of the pivot axes A1–A4 are positioned at essentially the same distance from the surface underlying the base 22.

Referring again to FIGS. 1, 2 and 2A, the carrier 20 also includes four carrier members 30. Because the carrier members 30 are substantially identical, only one carrier member 30 will be described herein; those skilled in this art will appreciate that the discussion is equally applicable to the remaining carrier members 30.

Referring still to FIGS. 1 and 2, the carrier member 30 has a generally planar main plate 32. At its lower end, the main plate 32 has two laterally-extending pins 34 that are received in an opposing pair of the apertures 26 of the base 22. The pins 34 are free to rotate within the apertures 26 about a respective pivot axis A1–A4.

Each carrier member 30 supports a splice tray 36. The splice tray 36 can be any splice tray or other device known to those skilled in this art to be suitable for providing splice sites for optical fibers. The splicing technique supported by the splice tray 36 can be mechanical, fusion, mass fusion, or any other known technique. Exemplary splice trays include the 1AF1-16LG Fusion Splice Organizer, the 1AMF1-6LG Mass Fusion Splice Organizer, and the 1AM1-12LG Mechanical Splice Organizer, all available from SYSTIMAX® Solutions, Inc. (Richardson, Tex.). Other devices that supply splice sites include OFSH-T-6-01 BLK and OFSH-T-12-01 BLK, both available from Richco, Morton Grove, Ill. In the illustrated embodiment, the splice tray 36 is mounted to the main plate 32 via an adhesive sheet 38 (shown in FIG. 1 in phantom line) with adhesive on both sides (such as "double-stick" tape), although other mounting techniques may also be employed.

Each of the carrier members 30 is free to rotate about its respective pivot axis A1–A4 between an access position (as shown in FIGS. 1 and 2) and a generally inverted non-access position (FIG. 2A). In the access position, all but the rearmost carrier member 30 are in stacked, generally parallel relationship, with the front side 32a of the carrier member 30 facing generally upwardly, such that the splice tray 36 mounted on the frontmost carrier member 30 is presented for installation or modification of splices. Any or all of the carrier members 30 can be moved individually or as a group of any size (much like a typical index card file) to the non-access position shown in FIG. 2A, in which rear side 32b of the carrier member 30 faces generally upwardly, and the splice tray 36 mounted thereon is not presented for work on its splice sites. In typical operation, at least one carrier member 30 remains in the access position to that its splice sites are available for installation or maintenance work.

In this configuration, any number of splice trays 36 can be stored in a small space. Also, any of the splice trays 36 can be accessed quickly without disturbing the splices in any of the other splice trays 36.

Those skilled in this art will recognize that the base 22 and carrier members 30 may take other configurations. For example, the base 22 may include pivot pins and the carrier members 30 may include corresponding apertures. As another example, rivets, threaded fasteners, or other components that enable one member to rotate relative to another member may replace the pins and apertures altogether. More or fewer carrier members may be employed. Other variations may be apparent to those skilled in this art and need not be described in detail herein.

Both the base 22 and the carrier members 30 can be formed of any suitable material, although polymeric materials are particularly suitable for their light weight and ease of molding into intricate configurations. Exemplary polymeric materials include polycarbonate, ABS, polystyrene, and other thermoplastic materials.

Another multi-tray splice site carrier, designated broadly at 40, is illustrated in FIGS. 3–6. The carrier 40 includes a base 42 and four carrier members 50; these components are described in greater detail below.

Figure 5:
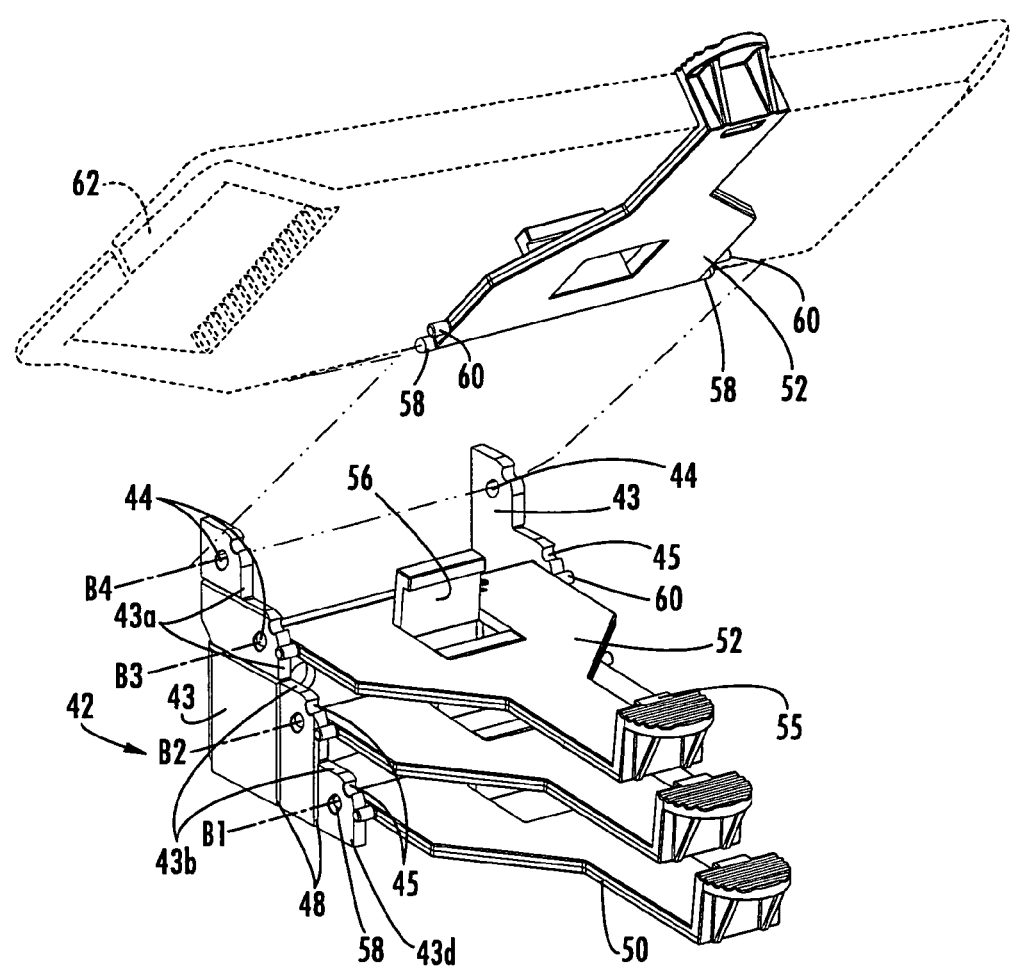
FIG. 5 is a partially exploded top perspective view of the splice site carrier of FIG. 3 with three splice trays removed and one splice tray shown in phantom line.

The base 42 has two side walls 43 spanned by a vertical mounting panel 46 that includes mounting apertures 47. The side walls 43 have a stair-step profile, with multiple horizontal edges 43b and vertical edges 43a (see FIG. 5) and are divided into substantially rectangular frangible sections by grooves 48. Each frangible section includes a pivot aperture 44; as with the carrier 20 illustrated in FIGS. 1–2A, pivot apertures 44 on one side wall 43 are substantially aligned with pivot apertures 44 on the opposing side wall 43 to form pivot axes B1, B2, B3, B4. As can be seen in FIG. 5, the pivot apertures 44 on the same side wall 43 are offset or staggered from one another, both vertically and horizontally, which in turn causes the pivot axes B1, B2, B3, B4 to be similarly staggered. Also, portions of the edges of the side walls 43 between the horizontal edges 43b and the vertical edges 43a include detents 45 that are positioned forwardly and upwardly from each pivot aperture 44.

Referring again to FIGS. 3–6, the four carrier members 50 are substantially identical. As a result, only one carrier member 50 will be described herein; those skilled in this art will appreciate that the discussion is equally applicable to the remaining carrier members 50.

Each carrier member 50 includes a generally planar main panel 52. A handling tab 54 extends upwardly from one end of the main panel 52. At the other end of the main panel 52, two pivot pins 58 extend laterally and are inserted into an aligned pair of pivot apertures 44 for pivotal movement about a respective pivot axis B1–B4. Also, two retention pins 60 extend laterally from the edges of the main panel 52 adjacent the pivot pins 58. The retention pins 60 are sized and positioned to be received in the detents 45 in the side walls 43 or to rest against the horizontal or vertical edges 43b, 43a of the side walls 43, depending on the orientation of the carrier member 50.

A latch 56 rises from the main panel 52 to capture one edge of a splice tray 62. A nub 55 extends slightly from the handling tab 54 toward the latch 56 to capture the opposite edge of the splice tray 62. As such, the splice tray 62 can be easily snapped into place on the carrier member 50.

In use, the carrier 40 is mounted such that the carrier members 50 (and, in turn, the splice trays 62) are generally horizontally disposed, with the splice trays 62 facing upwardly. Each carrier member 50 is free to move between an access position, in which the carrier member 50 is generally horizontal (see FIGS. 3 and 6) so that the splice tray 62 is accessible, and a partially inverted non-access position, in which the carrier member 50 has rotated about its respective axis of rotation B1–B4 to be generally vertically disposed (see the rearwardmost carrier member 50 in FIG. 4) so that the splice tray 62 is not accessible. As such, the carrier members 50 can be manipulated in "index card" fashion. Thus, in many respects the carrier 40 is quite similar to the carrier 20 illustrated in FIGS. 1 and 2. However, there are some differences that provide additional or alternative functionality to the carrier 40; these are described below.

First, the presence of the frangible sections in the side walls 43 provides the carrier 40 with the capability of being modified as desired by the user for any number of splice trays 62. For example, if the user wishes to use only three splice trays 62, the user can simply break off one frangible section from each side wall 43 (for example, section 43d as designated in FIG. 5), which action would leave three pairs of pivot apertures 44 to receive three carrier members 50 and three splice trays 62. Removing frangible sections as described can create additional space within the environment in which the carrier 40 resides or permit the carrier 40 to be used in a shallower enclosure.

Second, the inclusion of the latch 56 and nub 55 allow the carrier member 50 to capture the splice tray 62 without the use of an adhesive or other fastener. Because the latch 56 and nub 55 can be formed during the manufacture of the carrier member 50 (particularly if it is formed by the injection molding of a thermoplastic material), components for mounting the splice tray 62 on the carrier member 50 can be formed very inexpensively.

Figure 6:
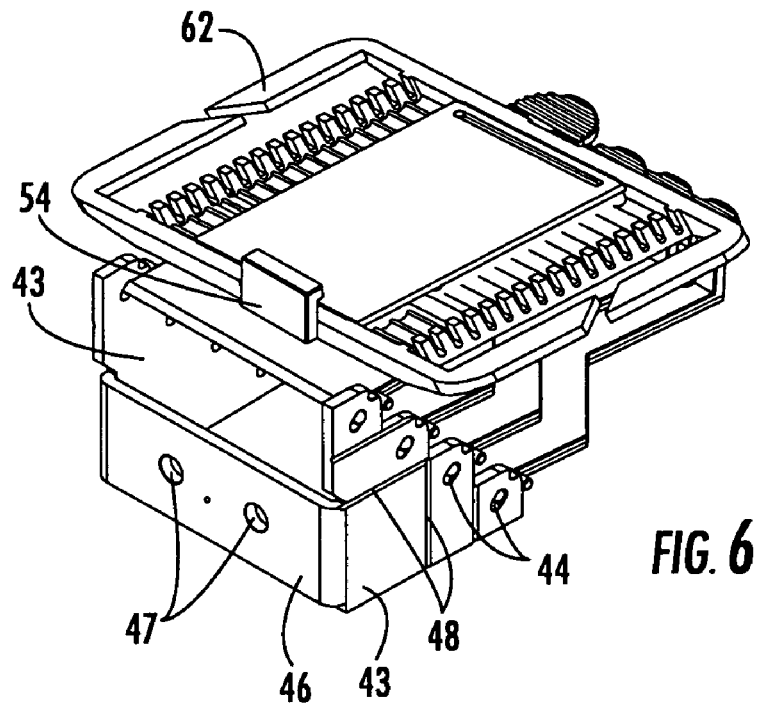
FIG. 6 is a bottom perspective view of the splice site carrier of FIG. 3 with the carrier members in their access positions.
Figure 7:
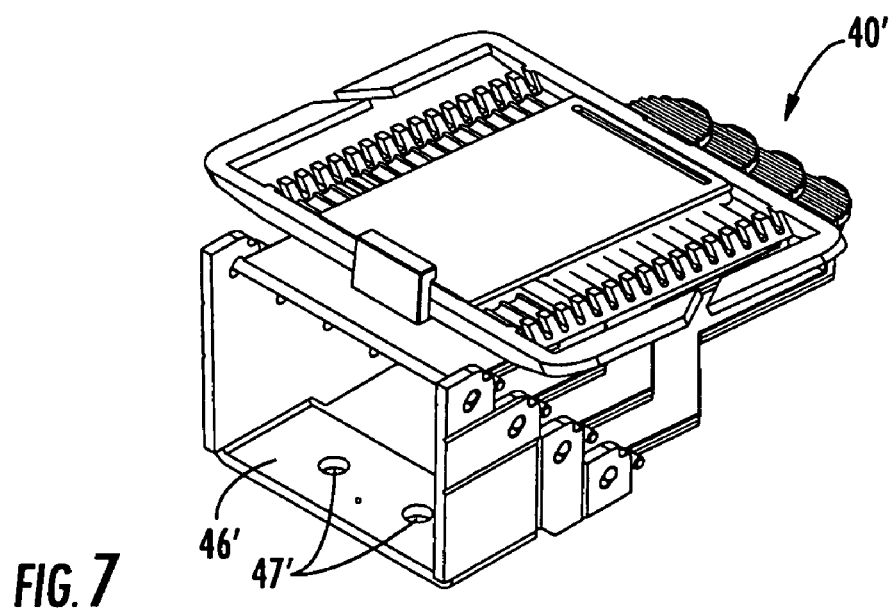
FIG. 7 is a bottom perspective view of an alternative embodiment of a splice site carrier like that in FIGS. 3–6 configured for floor mounting.
Figure 8:
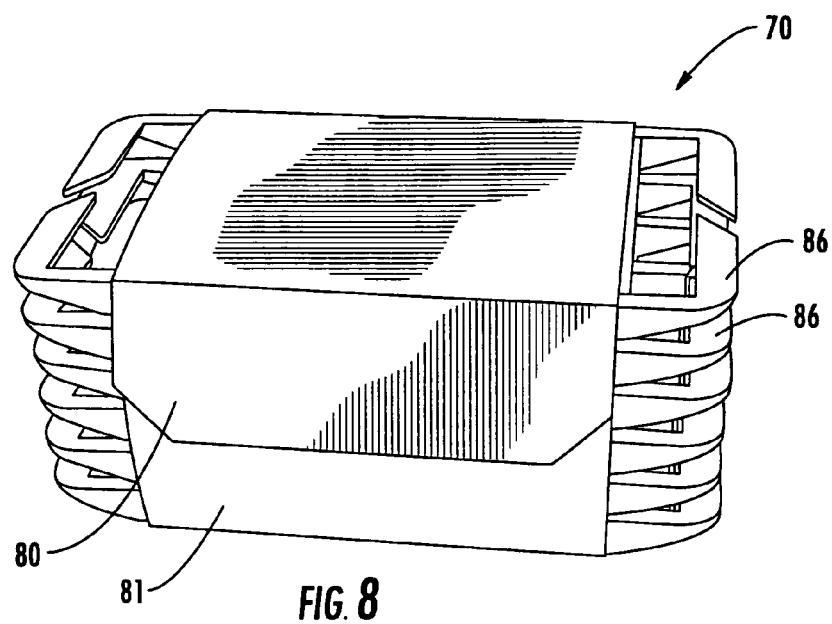
FIG. 8 is a perspective view of a splice site carrier according to additional embodiments of the present invention, wherein the carrier panels are secured in their access positions by the cover member.

Third, the mounting apertures 47 on the mounting panel 46 can be can be utilized to mount the carrier 40, typically via screws, other threaded fasteners, push rivets, or the like, to a vertical surface, as can be seen in FIG. 6. Alternatively, a carrier 40' may be configured for mounting to a horizontal surface (such as a shelf), as shown in FIG. 7, via a mounting panel 46' with apertures 47'.

Fourth, the stair-step profile of the side walls 43 enables each carrier member 50 to be retained in the access and non-access positions as well as an intermediate position. The retention pins 60 of each carrier member 50 rest against the vertical edges 43a of the side walls 43 (when the carrier member 50 is disposed as shown in FIG. 6), which maintains the carrier members 50 in the access position. A slight force applied to the carrier member 50 urges it toward the non-access position; this force causes the retention pins 60 to deflect sufficiently to enable them to slide over the end of the horizontal edge to the detents 45. This places the carrier member 50 in an intermediate position in which it defines an angle of approximately 45 degrees to the mounting panel 46 (see middle two splices trays 62 in FIG. 4). From the intermediate position, resumption of the application of force to the carrier member 50 releases the retention pins 60 from the detents 45 and drives the carrier member 50 to the non-access position (see leftmost splice tray 62 in FIG. 4), where the interaction between the retention pins 60 and the horizontal edges 43b of the side walls 43 help to maintain the carrier member 50 in place.

Fifth, the offset or staggered positioning of the pairs of pivot apertures 44 (and, in turn, the positioning of the pivot axes B1, B2, B3, B4) can enable all of the carrier members 50 to overlie one another in stacked, substantially parallel relationship in both the access and non-access positions. This fully stacked relationship of the carrier members can be realized whether the base 42 is oriented either for wall mounting (see FIG. 6) or floor mounting (see FIG. 7), with the carrier members 50 being able to pivot from an access position to a non-access position in either orientation. Moreover, in some embodiments it may be possible for the carrier members 50 to be detached from the base 42, inverted, and re-attached to the base 42 to enable the carrier 40 to be converted between wall and floor mounting.

The base 42 and carrier members 50 can be formed of the same materials discussed above for the carrier 20. In addition, many of the design variations discussed above with respect to the carrier 20 may also be employed in the carrier 40.

Referring now to FIGS. 8–11, another carrier of the present invention, designated broadly at 70, is illustrated therein. The carrier 70 is formed from a flexible sheet (typically a flexible polymeric material such as polypropylene) that is folded back upon itself numerous times to form carrier members.

Figure 9:
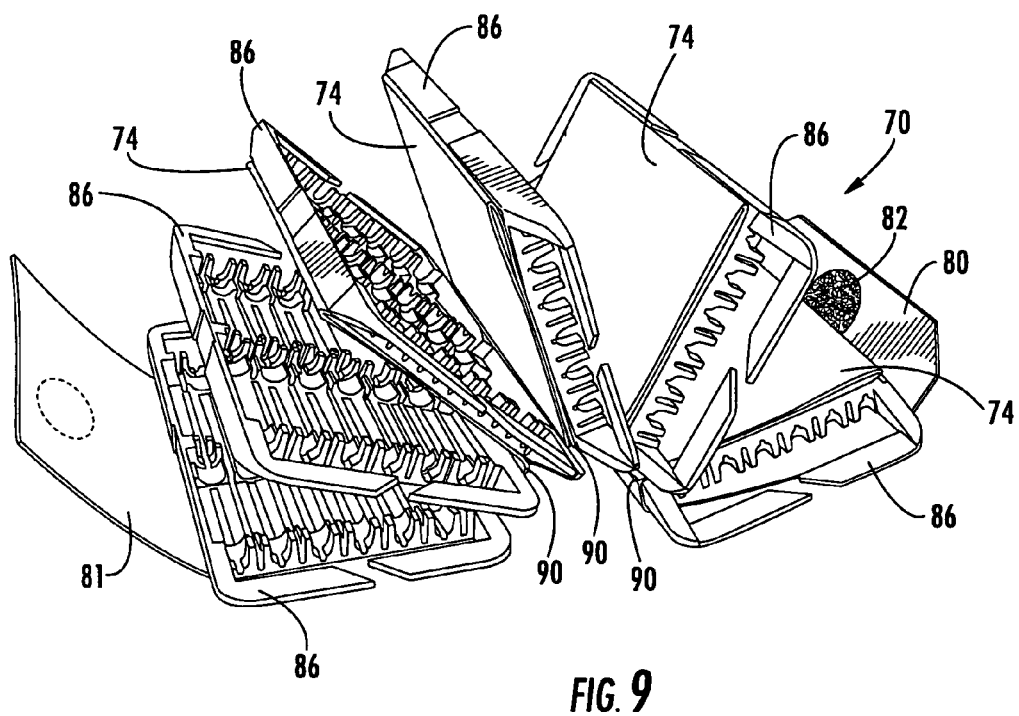
FIG. 9 is a side perspective view of the splice site carrier of FIG. 8 with the cover member detached and the carrier panels and splice trays mounted thereto in a variety of intermediate positions.
Figure 10A:
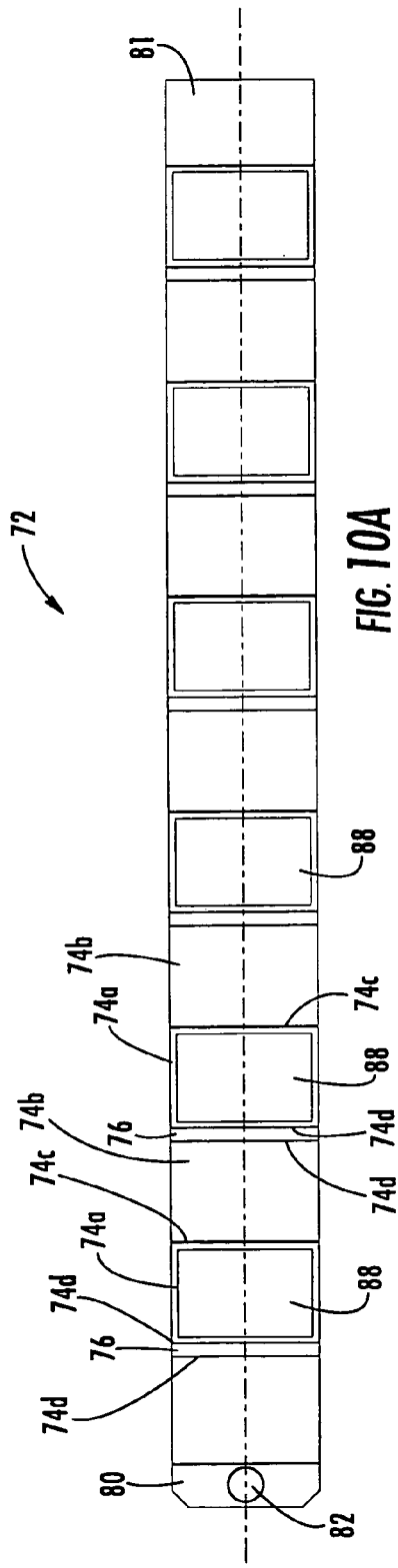
FIG. 10A is a top view of a blank of an elongate flexible sheet used to form the splice site carrier of FIG. 8.
Figure 10B:
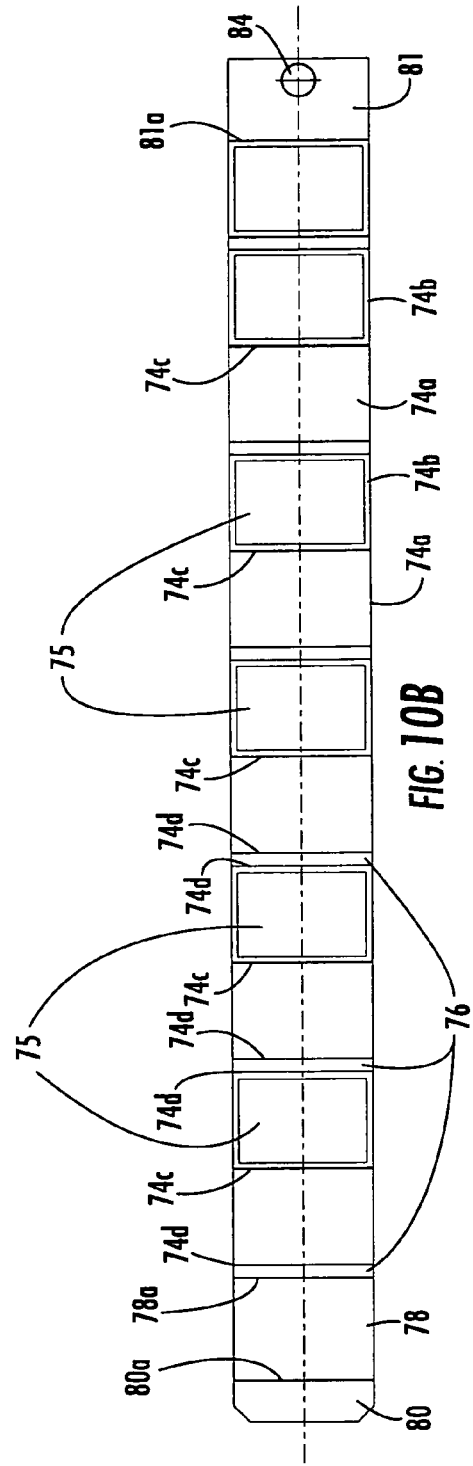
FIG. 10B is a bottom view of a blank of an elongate flexible sheet used to form the splice site carrier of FIG. 8.
Figure 11:
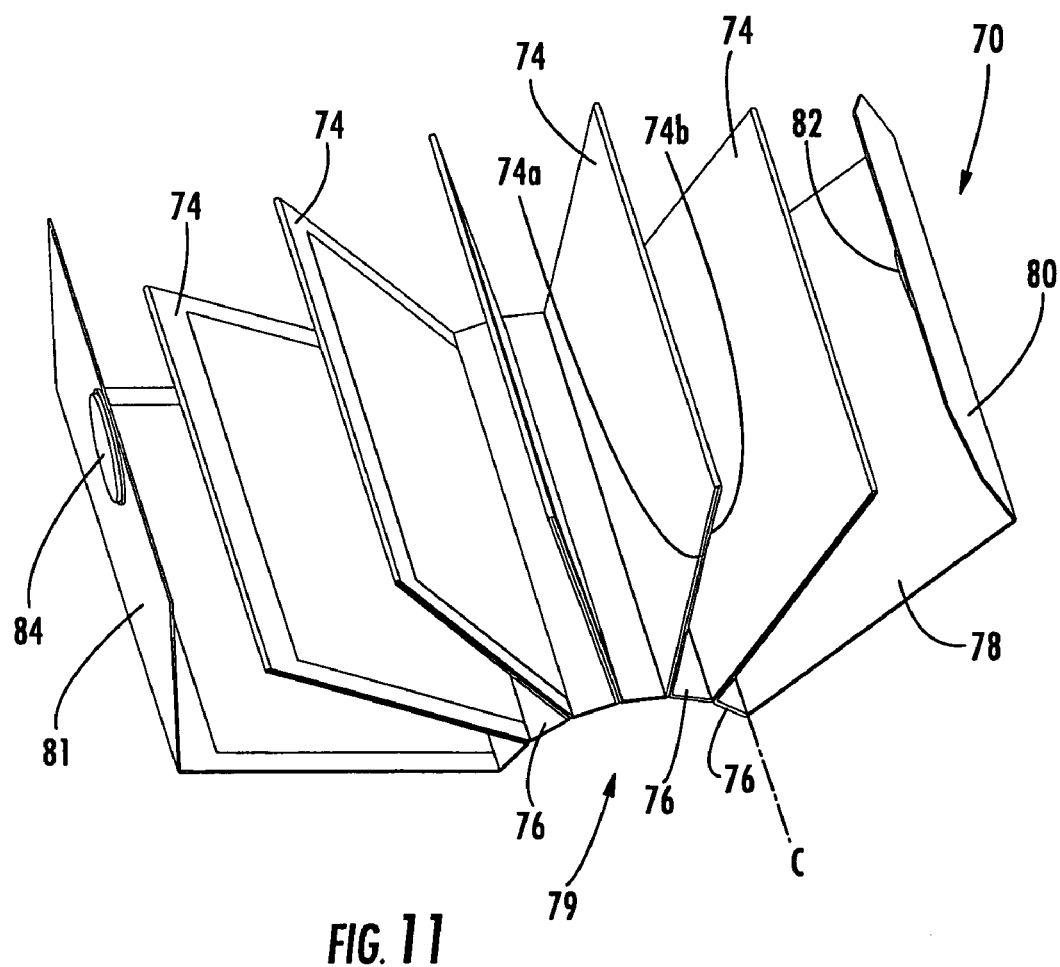
FIG. 11 is a side perspective view of the splice site carrier of FIG. 9 with the splice trays removed.

Referring first to FIGS. 9–11, the carrier 70 includes a plurality of carrier members 74 that are interconnected by intermediate panels 76. Each carrier member 74 is formed of two overlying panels 74a, 74b of a unitary flexible sheet 72 (see FIG. 11). Each intermediate panel 76 is formed of the material of the flexible sheet 72 that resides between adjacent pairs of overlying panels 74a, 74b, with adjacent intermediate panels 76 meeting at their edges to form an overall interconnecting member 79. Thus, a living hinge 90 is formed at the fold lines between adjacent carrier members 74 and intermediate panels 76 that defines a pivot axis C for each of the carrier members 74. The carrier 70 also includes a cover panel 78 with a flap 80 and a front panel 81. A hook-and-loop fastener 82 is attached to the flap 80, and a mating hook-and-loop fastener 84 is attached to the bottom panel 81.

The carrier 70 is created by folding the flexible sheet 72 into a plurality of leaves to form the carrier members 74 and intermediate panels 76. FIGS. 10A and 10B show the configuration of the flexible sheet 72 (typically formed of polypropylene, although other flexible materials may also be employed) prior to folding. Designated fold lines 74c separate the panels 74a, 74b of each carrier member 74, and designated fold lines 74d separate the panels 74a, 74b from adjacent intermediate panels 76. The cover panel 78 is formed by folding the sheet 72 along fold line 78a, and the flap 80 is formed by folding the sheet 72 along fold line 80a. The front panel 81 is formed by folding the sheet along fold line 81a. All of the aforementioned folds may be achieved through techniques known to those skilled in this art. The panels 74a, 74b are attached to one another via double-sided adhesive sheets 75 (FIG. 10B). Optionally, the carrier members 74 may be reinforced by sealing or otherwise attaching the edges of the panels 74a, 74b; it may be particularly advantageous to seal the fold lines 74d of adjacent panels 74a, 74b, as doing so may improve the integrity of the living hinges 90 formed thereby.

Splice trays 86 are mounted to the panel 74a of each carrier member 74. In the illustrated embodiment, the splice trays 86 are attached via double-sided adhesive sheets 88 (see FIG. 10A), although other attachment techniques may also be suitable.

When the carrier 70 is closed (FIG. 8), the splice trays 86 and the carrier members 74 are in stacked, alternating, generally parallel relationship. The intermediate panels 76 (not shown in FIG. 8) are disposed normal to the carrier members 74. The cover panel 78 is parallel to the carrier members 74, and the front panel 81 is normal to the carrier members 74 on the side opposite the intermediate panels 76. The flap 80 overlies a portion of the front panel 81 such that the fastener 82 mates with the fastener 84.

In order to perform work on a splice within the carrier 70, a user would simply detach the flap 80 from the front panel 81 and rotate the cover panel 78 about its living hinge 90. Doing so would present the uppermost splice tray 86 to the user. The user would then be free to rifle in "index card" fashion through the splice trays 86, with each splice tray 86 moving from an access position to a non-access position via rotation about the living hinge 90 of its associated carrier member 74, until the splice tray 86 of interest were reached.

Although the carrier 70 can be mounted in a number of orientations, it may be preferred to mount the carrier 70 to a horizontal surface, such as a shelf. If this is the case, one suitable orientation would have the splice trays 86 and carrier members 74 parallel to the mounting surface, with the cover panel 80 facing upwardly. It may also be advantageous to mount the carrier 70 to a vertical surface. If so, one suitable orientation would have the splice trays 86 and carrier members 74 parallel to the mounting surface, with the cover panel 80 facing forwardly and the intermediate panels 76 facing downwardly. In either of these orientations, detachment of the flap 80 from the front panel 81 can provide simple and convenient access to and manipulation of the splice trays 86.

Figure 12:
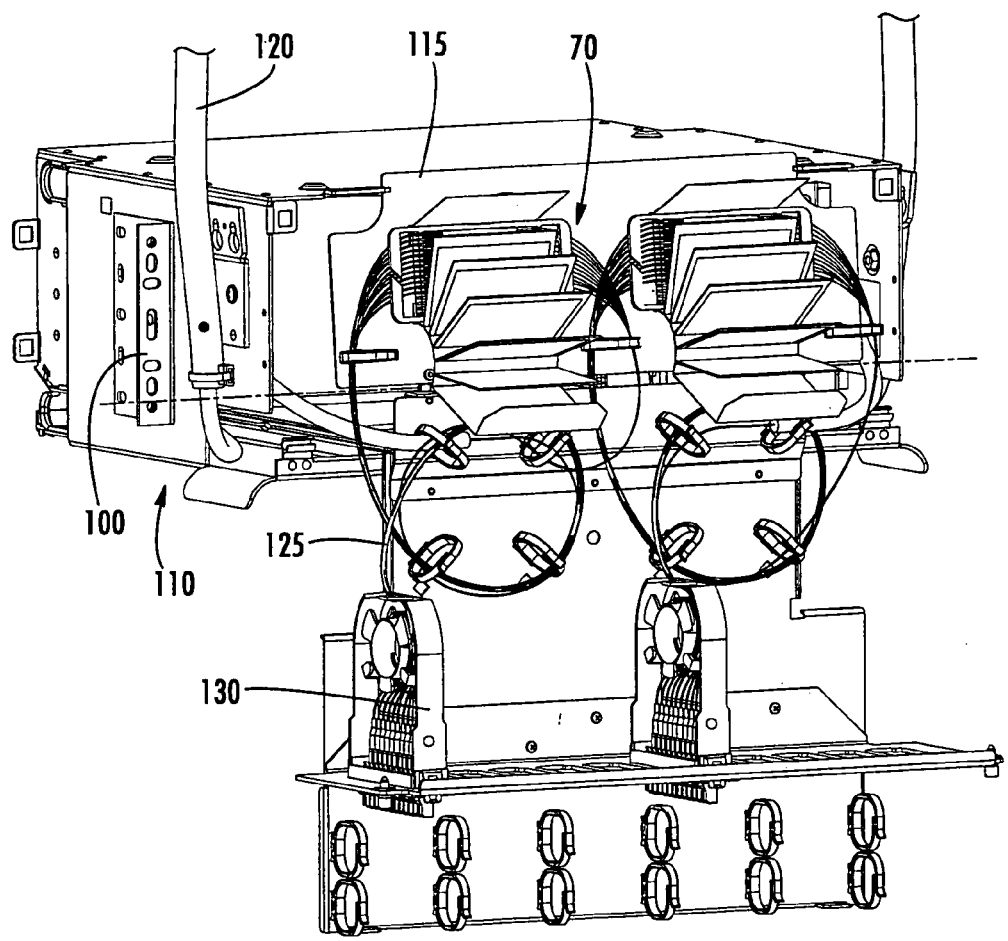
FIG. 12 is a perspective view of a splice site carrier of FIGS. 9–11 in place in a data center shelf.

Turning now to FIG. 12, the carrier 70 can be included in a shelf 110 on an equipment rack 100. This particular shelf 110, which is described in greater detail in co-assigned and co-pending U.S. patent application Ser. No. 10/832,893, filed Apr. 27, 2004 and entitled ARTICULATED HIGH DENSITY FIBER OPTIC SPLICE AND TERMINATION SHELF, includes a splice site mounting panel 115 that is vertically oriented during normal operation and during maintenance of the carrier 70. Fiber optic cables 120 feed into the carrier 70, wherein splicing between optical fibers of the fiber optic cables 120 and pigtail fibers 125 is achieved. The pigtail fibers 125 lead to a termination device 130, wherein they are optically connected with jumper fibers (not shown).

Those skilled in this art will recognize that other environments may also be suitable for use with the carriers of the present invention. For example, other splicing shelves, such as the 600 series family of shelves offered by SYSTIMAX Solutions, Inc., Richardson, Tex., may be employed. Alternatively, other structures, such as Interconnection Units (LIU) 100 or 200, also available from SYSTIMAX® Solutions, Inc., may also be used.

The foregoing is illustrative of the present invention, and is not to be construed as limiting thereof. Although exemplary embodiments of this invention have been described, those skilled in the art will readily appreciate that many modifications are possible in the exemplary embodiments without materially departing from the novel teachings and advantages of this invention. As such, all such modifications are intended to be included within the scope of this invention. The scope of the invention is to be defined by the following claims.

The invention claimed is:

1. A multi-tray splice site carrier, comprising:
an elongate flexible sheet, the elongate sheet folded back on itself at multiple locations to form a plurality of leaves, the leaves serving as carrier members, the carrier members being separated from each other by intermediate panels, each of the carrier members being configured to receive a splice tray mounted on a front side thereof, each of the carrier members being pivotable about a respective pivot axis defined by a living hinge between an access position, in which the front side of the carrier member faces in a first direction, such that the splice tray is presented for access to splice sites thereon, and a non-access position that is at least partially inverted from the access position, in which a rear side of the carrier member is presented and the splice site tray is not accessible;
wherein when all of the plurality of carrier members are in the access position, at least some of the carrier members are in stacked, generally parallel relationship, and when all of the carrier members are in the non-access position, at least some of the carrier members are in stacked, generally parallel relationship, and wherein the carrier members can be rotated individually from the access position to the non-access position to provide access to any of the carrier members.

2. The splice site carrier defined in claim 1, wherein in the access position, all of the carrier members are in stacked, generally parallel relationship.

3. The splice site carrier defined in claim 1, wherein the elongate flexible sheet further includes a cover panel at one end that covers edges of the carrier members when they are in the access position and maintains the carrier members in the access position.

4. The splice site carrier defined in claim 3, wherein the cover member further includes a flap that fastens to one surface of a front panel that is attached to a carrier member.

5. The splice site carrier defined in claim 4, wherein the flap fastens to the front panel via a hook and loop fastener.

6. The splice site carrier defined in claim 1, wherein each carrier member includes an adhesive sheet adapted to mount a splice tray thereon.

7. The splice site carrier defined in claim 1, further comprising a splice tray mounted on each carrier member.

8. A multi-tray splice site carrier, comprising:
an elongate flexible sheet, the elongate sheet folded back on itself at multiple locations to form a plurality of leaves, the leaves serving as carrier members, the carrier members being separated from each other by intermediate panels, each of the carrier members being configured to receive a splice tray mounted on a front side thereof, each of the carrier members being pivotable about a respective pivot axis defined by a living hinge between an access position, in which the front side of the carrier member faces in a first direction, such that the splice tray is presented for access to splice sites thereon, and a non-access position that is at least partially inverted from the access position, in which a rear side of the carrier member is presented and the splice site tray is not accessible;

wherein when all of the plurality of carrier members are in the access position, at least some of the carrier members are in stacked, generally parallel relationship, and when all of the carrier members are in the non-access position, at least some of the carrier members are in stacked, generally parallel relationship, and wherein the carrier members can be rotated individually from the access position to the non-access position to provide access to any of the carrier members; and wherein a splice tray is adhesively mounted onto each carrier member.

9. The splice site carrier defined in claim 8, wherein in the access position, all of the carrier members are in stacked, generally parallel relationship.

10. The splice site carrier defined in claim 8, wherein the elongate flexible sheet further includes a cover panel at one end that covers edges of the carrier members when they are in the access position and maintains the carrier members in the access position.

11. The splice site carrier defined in claim 10, wherein the cover member further includes a flap that fastens to one surface of a front panel that is attached to a carrier member.

12. The splice site carrier defined in claim 11, wherein the flap fastens to the front panel via a hook and loop fastener.

13. The splice site carrier defined in claim 8, wherein each carrier member includes an adhesive sheet for mounting its splice tray thereon.

14. An equipment rack for the splicing of communications cables, the equipment rack including a shelf, the shelf having mounted thereon a multi-tray splice site carrier, the splice site carrier comprising:

an elongate flexible sheet, the elongate sheet folded back on itself at multiple locations to form a plurality of leaves, the leaves serving as carrier members, the carrier members being separated from each other by intermediate panels, each of the carrier members being configured to receive a splice tray mounted on a front side thereof, each of the carrier members being pivotable about a respective pivot axis defined by a living hinge between an access position, in which the front side of the carrier member faces in a first direction, such that the splice tray is presented for access to splice sites thereon, and a non-access position that is at least partially inverted from the access position, in which a rear side of the carrier member is presented and the splice site tray is not accessible;

wherein when all of the plurality of carrier members are in the access position, at least some of the carrier members are in stacked, generally parallel relationship, and when all of the carrier members are in the non-access position, at least some of the carrier members are in stacked, generally parallel relationship, and wherein the carrier members can be rotated individually from the access position to the non-access position to provide access to any of the carrier members.

* * * * *